United States Patent [19]

Abramov

[11] Patent Number: 5,259,059
[45] Date of Patent: Nov. 2, 1993

[54] OPTICAL FIBERS WITH BUILT-IN ALIGNMENT FEATURES

[75] Inventor: Igor Abramov, Redondo Beach, Calif.

[73] Assignee: Xerox Corporation, Stamford, Conn.

[21] Appl. No.: 988,501

[22] Filed: Dec. 10, 1992

[51] Int. Cl.$^5$ .................................................. G02B 6/20
[52] U.S. Cl. .................................. 385/123; 385/126; 385/146; 385/125
[58] Field of Search ................. 385/123, 126, 125, 146

[56] References Cited

U.S. PATENT DOCUMENTS

| | | | |
|---|---|---|---|
| 4,925,269 | 5/1990 | Scrivener | 385/126 X |
| 4,938,561 | 7/1990 | Grasso et al. | 385/126 X |
| 4,950,318 | 8/1990 | Dyott | 385/146 |
| 5,182,783 | 1/1993 | Bosc et al. | 385/123 |

Primary Examiner—John D. Lee
Assistant Examiner—Stephen W. Barns
Attorney, Agent, or Firm—Nola Mae McBain

[57] ABSTRACT

An optical fiber containing intrinsic alignment features is disclosed. The fiber comprises a core, cladding layer, cladding insert or inserts, and a jacket. The outer shape of the tip of a fiber can be altered by etching away the jacket and cladding insert or inserts. The respective solubilities of the cladding insert and the cladding layer in etchants are selected to provide control of the resulting fiber shape upon completion of etching.

8 Claims, 4 Drawing Sheets

OPTICAL FIBERS WITH BUILT-IN ALIGNMENT FEATURES

FIELD OF INVENTION

This invention relates to optical fibers and ways of interfacing the same with connectors and other structures.

BACKGROUND OF THE INVENTION

In recent years numerous types of specialized optical fibers have been created. The emergence of single-mode and polarization-maintaining optical fibers having very small dimensions of the light-carrying portion of the fiber, also known as the "core", necessitates extremely tight alignment tolerances when the fibers are spliced together or terminated in a connector or a coupler. Generally, ferrules having precision apertures are employed to precisely position the fibers. These ferrules are ordinarily made of hard materials such as steel, sapphire, and ceramics and are quite expensive.

The polarization-maintaining fibers, in addition to precise transverse alignment of the cores, require a rotational alignment as well in order to match the polarization-maintaining directions of the cores to be connected. Ordinarily, this is achieved by rotating one of the fibers in a connector prior to permanent securing, while light is launched through one of the fibers. By observing the light propagation through the connection, an operator then optimizes the rotation angle of the fiber and secures it. This splice preparation is cumbersome, slow, requires coupling of light from a source into the fiber, and depends extensively on the skill of the operator.

In addition, in some applications several fiber cores are required to be positioned side-by-side at precisely controlled distances. One such application is a connector which terminates several fibers simultaneously. Another application is in a xerographic-type printer, where several fibers are used as point light sources. Such an application is disclosed, for instance, in an article titled "Single-Mode Fiber Printheads And Scanline Interleaving For High Resolution Laser Printing" by D. Haas et al. in Volume 10/9 of Optical Engineering magazine published in 1989 by the Society of Photo-Instrumentation Engineers. The article discloses that in order to provide precise lateral separation between the fibers, photolithographically-defined grooves in a semiconductor wafer were utilized. The fibers were secured in these grooves, and precision separation of the cores was thus maintained.

In addition to being expensive, the grooved substrates do not facilitate rotational alignment for polarization-maintaining fibers, nor are they effective in providing reliable alignment when the required core separation is close to one fiber diameter, i.e., when the fibers are almost touching one another. In the latter case the grooves have to be made quite shallow, and thus their alignment properties are greatly diminished.

SUMMARY OF THE PRESENT INVENTION

Accordingly, the purpose of the present invention is to provide alignment features built into the fibers themselves to simplify their alignment inside connectors and fixtures.

It is a further purpose of this invention to provide means for precise side-by-side stacking of fibers in multi-fiber assemblies by controlled alteration of the fiber shape after fabrication.

It is still a further purpose of the present invention to provide permanent mechanical references to the fiber core and its optical features, such as preferred polarization direction, birefringence, and ovality among others.

The fibers in the present invention contain a core, a cladding layer surrounding the core, and cladding inserts joined to the cladding layer. These elements are made of glass for glass fibers, or of polymer for plastic-type fibers. The cladding insert material differs from the cladding layer chemically, but preferably, not physically. The cladding inserts are incorporated into the fiber at the preform stage and prior to drawing and extend through the whole length of the fiber after drawing.

To prepare the tip of a fiber, a fiber is immersed into a suitable chemical etchant or solvent, and the cladding inserts, due to their special composition dissolve much faster than the rest of the cladding. Upon a pre-determined etching time, the fiber tip takes a shape of the undissolved cladding layer which is conducive to precision alignment within a connector and/or positioning. For example, depending on the shape of the cladding insert, the resulting fiber tip can have an alignment key formed in it, or have a "D"-shape, or can be flattened from two opposing sides, thus creating a flat fiber ribbon tip.

The position of the insert can be precisely controlled during the fiber preform manufacture, and thus the resulting etched features are in precise alignment with respect to the light-carrying core of the fiber, enabling their precise mechanical alignment, especially if fiber connectors are made to interface with these alignment features.

The fiber jacket, and the inserts are dissolved, leaving a flat, ribbon-like cladding with a core in the middle.

Figure 3:
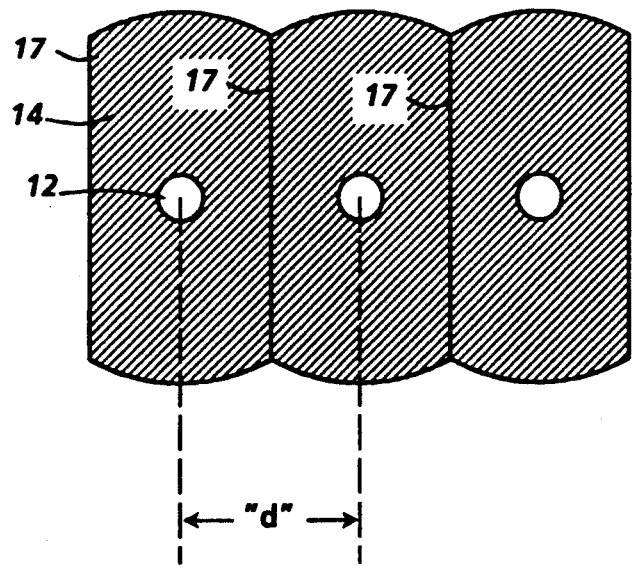
Figure 4:
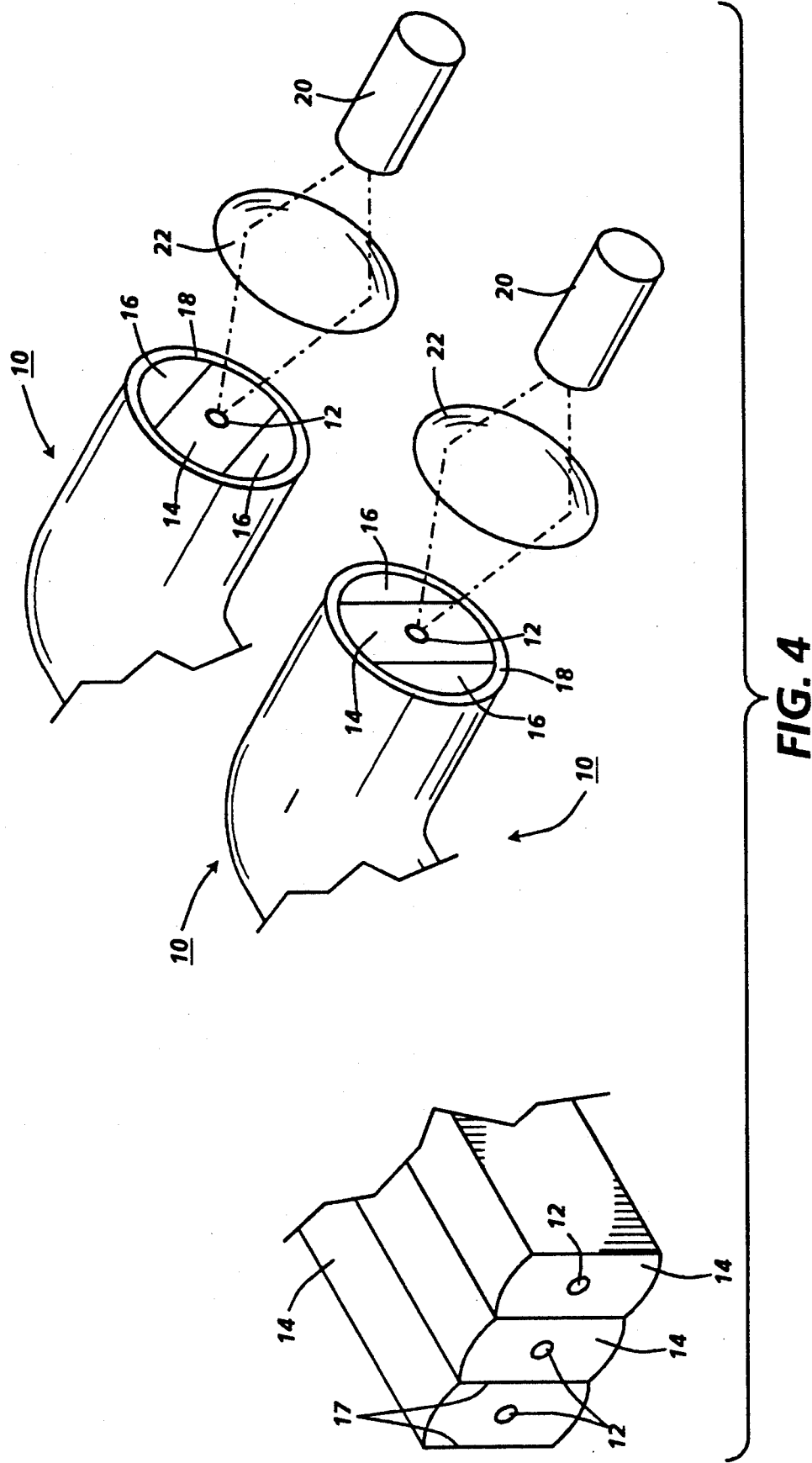

FIG. 3 is a cross sectional view of an optical fiber with a single rectangular cladding insert;

FIG. 4 is a cross sectional view of the optical fiber of FIG. 3 after an etching operation; which created a rectangular alignment "key" in the fiber cladding.

Figure 5:
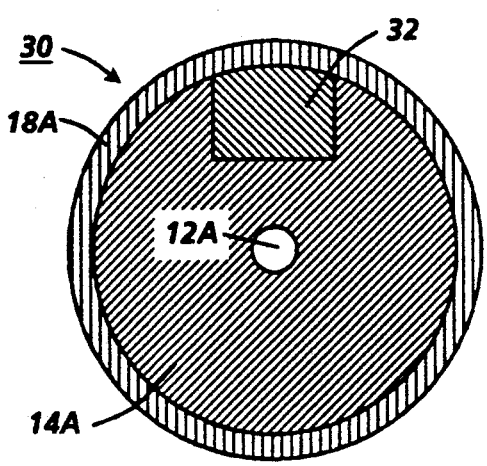

FIG. 5 is a cross sectional view of an optical fiber with single "D" shaped cylindrical cladding insert; of an optical fiber with a single semi-cylindrical cladding insert before and after etching, which creates a "D"-shaped fiber tip.

Figure 1:
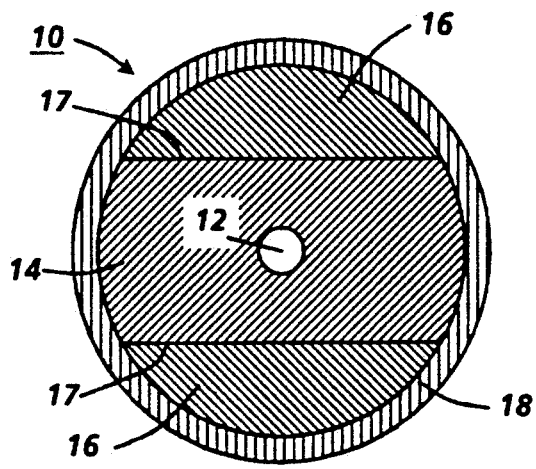
FIG. 1 is a cross sectional view of an optical fiber with two semi-cylindrical cladding inserts.
Figure 2:
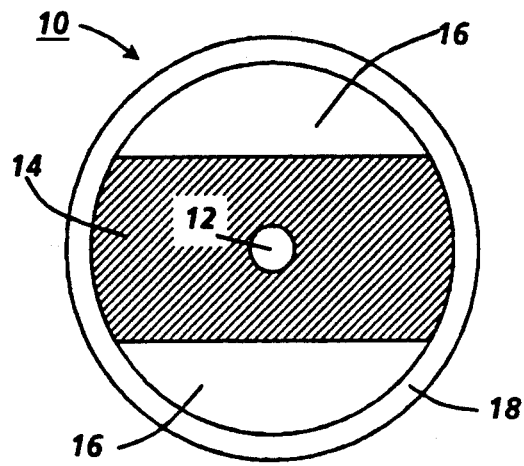
FIG. 2 is a cross sectional view of the optical fiber of FIG. 1 after an etching operation.
Figure 6:
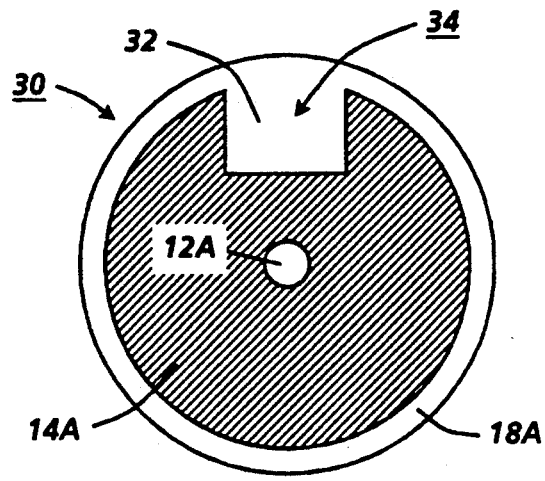
Figure 7:
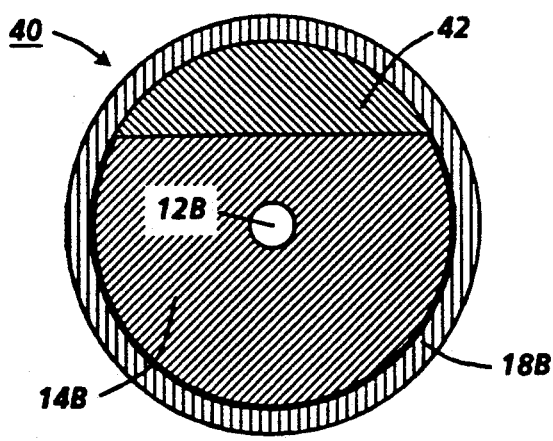
Figure 8:
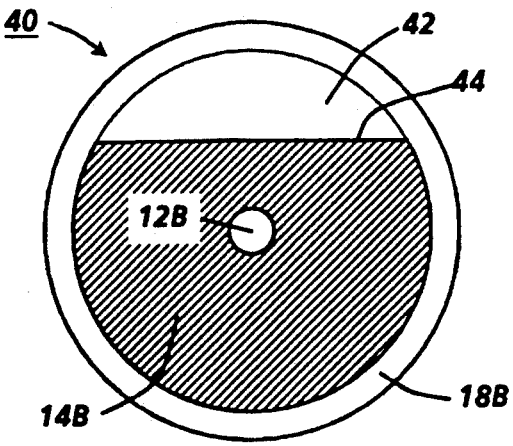
Figure 9:
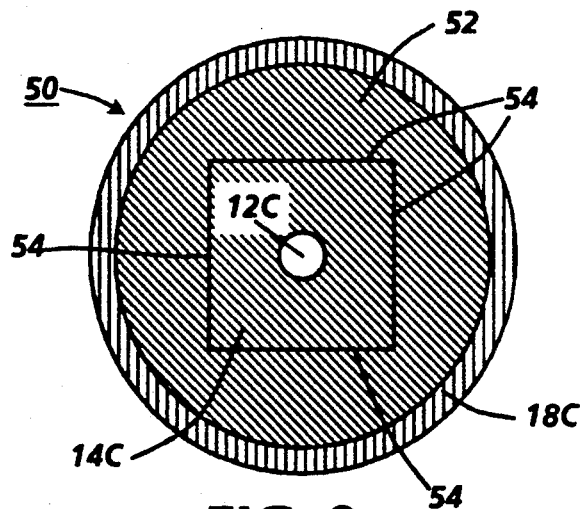

FIG. 6 is a cross sectional view of the optical fiber of FIG. 5 after an etching operation;

FIG. 7 is a cross sectional view of an optical fiber with four semi-cylindrical cladding inserts;

FIG. 8 is a cross sectional view of the optical fiber of FIG. 5 after an etching operation;

FIG. 9 is a cross sectional view of a multiple fiber assembly in which several fiber "ribbon" tips similar to the one of FIGS. 1 and 2 are brought together for precise termination.

Figure 10:
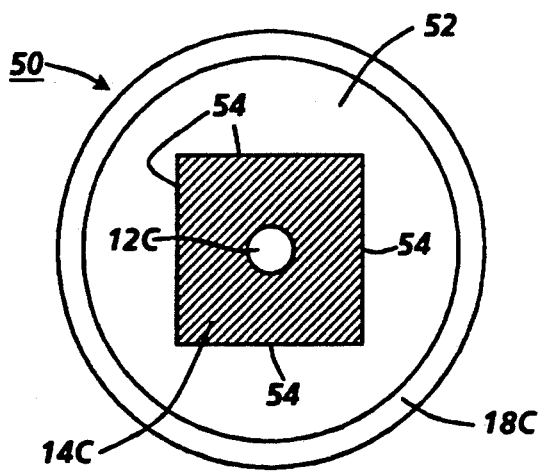

FIG. 10 is a perspective view of a multi fiber "ribbon tip" assembly in a typical multiple light source application.

DETAILED DESCRIPTION OF THE INVENTION

Ordinarily, fibers contain a light carrying core and a protective cladding layer. Specialty fibers, such as of the polarization-maintaining type, may contain additional elements surrounding the core, such as eccentric cladding inserts which are designed to exert a non-uniform pressure on the core to affect its optical properties.

Referring to FIG. 1, the optical fiber 10 of the present invention comprises a light-guiding core 12, surrounded by a cladding layer 14 which is positioned between two opposite longitudinal cladding inserts 16. The interface between the cladding inserts and the cladding layer where each insert is joined to the cladding layer is a flat surface 17. The core and cladding assembly is surrounded by jacket 18. The cladding inserts 16 are assembled into the fiber 10 at a preform stage.

Preferably, the cladding inserts 16 extend through the entire length of the fiber. However, the cladding inserts 16 can be fabricated as short sections positioned inside the cladding layer 14 at regular intervals. This would be desirable if cladding insert 16 material is expensive with respect to the cladding layer 14. Such inserts can be thermally fused into the pre-made depressions in glass fiber claddings, or solvent-fused into the polymer ones. The inserts can also be made to contain colored, luminescent or radio active dopants to assist in their location and identification, and determination of fiber length.

To efficiently transmit light, the refractive index of the core 2 should be greater than that of the cladding layer 14 and cladding inserts 16, i.e., $$N_{core} > N_{cladding}$$

where N is the refractive index.

The core can have a homogenous composition with a constant refractive index, or have an index varying as a function of the core radius:

$$N_{core} = \text{const.} \quad (1)$$

$$N_{core} = f(r_{core}) \quad (2)$$

where r is the fiber core radius.

The fibers of the construction corresponding to (1) are known as a "step-index". These fibers usually have a very small core, which transmits only a single mode of coherent light from a laser, and are widely used in telecommunications industry for long-haul signal transmission. Fibers of this type are generally called single mode. By incorporating various glass components with different coefficients of thermal expansion around the core, the core can be mechanically stressed during fiber fabrication and its optical qualities altered. For instance, it is possible, by applying an anisotropic stress, to induce optical birefringence in the core and thus make it selective for a light of a particular polarization. Such fibers are known as polarization-maintaining. Generally, to ascertain the location and orientation of such features it is necessary to inject light into the fiber and analyze the transmission of the emitted. Advantageously, the present invention obviates the need for such optical measurements since there are now permanent mechanical references which are aligned with the optical features.

The fibers whose construction can be described by (2) generally have an index profile closely resembling a parabola, with the highest index occurring at the center of the core and decreasing towards the core periphery. Such construction improves signal transmission qualities of the fiber for a so-called multi-mode operation. Fibers of this construction can transmit much more light than the single mode ones, have a much larger ratio of core and cladding diameter, and are commonly used for short-haul data communications In addition to glass fibers discussed above, there exist fibers made of transparent polymers. Their optical construction is essentially similar to that of the glass fibers. The present invention is applicable to all types of optical fibers, since it does not strive to alter their optical characteristics, but rather to provide precise mechanical indexing.

The cladding inserts 16 are made of a material whose mechanical properties, such as the coefficient of thermal expansion, among others, are generally similar to or closely match those of the cladding layer 14. The cladding inserts 16 can be made of the same base material as the cladding layer 14, but it may contain chemical additives and dopants which make it more soluble in solvents or etchants than the cladding layer 14. Ideally, the cladding inserts 16 should be completely soluble in a particular solution, while the cladding layer 14 remains altogether impervious to it.

Jacket 18 is constructed of a material similar to the cladding inserts 16 (such as glass or polymer) and is used to stabilize the fiber components in a single assembly while providing a uniform outer fiber surface for improved tensile strength of the finished product. If materials used for the cladding inserts 16 and the cladding layer 14 are very close to each other in their mechanical properties and fiber 10 component fusing is of high quality, the jacket 18 may be omitted.

The tip of the fiber 10 is prepared for connection by etching which is performed by immersing the tip of the fiber 10 into a suitable etchant or solvent. Likewise, an ion or plasma assisted selective reactive etching in a controlled atmosphere can also be performed. The jacket 18, if present, is etched away first, followed by inserts 16.

In case of glass fiber claddings 14 and 16, an etchant based on hydrofluoric acid can be used. One such etchant is BOE brand made by General Chemical Corporation of Pittsburgh, Pa. The cladding inserts 16 can be made of "soft" glass, such as the one having high lead content, and can be etched at the rate much greater than that of the cladding layer 14, which can be made of undoped silica glass. The difference in etching rates leads to the inserts 16 being etched away, with most of the cladding layer 14 remaining virtually intact.

If the cladding layer 14 is made of silicon dioxide and the cladding insert 14 is made of silicon nitride, there exists a number of etchants which dissolve the nitride but not the oxide. These etchants are widely used by the microelectronics industry in integrated circuits fabrication. Likewise, the materials and their corresponding etchants can be interchanged between the cladding layer 14 and cladding inserts 16 without loss of functionality.

For polymer claddings, the etchant or solvent choice is much broader than for glass-based fibers. Polymeric materials for cladding inserts 16 can be selected to be soluble in specific solvents which do not attack cladding layer 14 made of different polymeric materials.

If a fiber jacket 18 is used, and its composition is different from that of the cladding inserts 16, an additional solvent/etchant may be required to remove it prior to dissolving the cladding inserts 16.

FIG. 2 shows the tip of the jacket 18 and cladding inserts tip of the fiber 10 etched away resulting in an essentially flat, ribbon like fiber tip.

FIG. 3 features an end view of a multiple fiber assembly utilizing the ribbon tipped fibers of the embodiment of FIG. 2. Due to their reduced thickness the fibers 10 can be positioned much closer to each other with their flat surfaces 17 abutting. The distance "d" between the fiber cores shown in FIG. 3 is thus much smaller than the diameter of an un-etched fiber 10. Advantageously, the transverse dimension of the fibers remain virtually unaltered, thus providing considerable transverse rigidity to the assembly. In addition, because the inserts 16 were in permanent alignment with the core 12, a precise alignment of optical core features between fibers is effected. Such core features may include a major polarization axis or ovality of the core among other core features.

Such an arrangement can be very advantageous in systems where small independent light sources have to be positioned close to each other, as, for example, in some optics-based printers and plotters.

One such system is depicted on FIG. 4 which shows a multitude of individual fibers 10 which have been prepared and etched as shown in FIG. 2 and are brought together into a compact bundle 19. Each fiber is connected at its free distal end to a dedicated light source 20, which can be a laser diode. The light emitted by each source 20 is focused by a lens 22 into a respective fiber core 12. The light pattern emitted by the bundle 19 thus comprises a multitude of closely spaced independently controlled point light sources. Such a closely spaced pattern is generally very difficult to produce by any other means, especially where a large number of individual light sources is involved.

FIGS. 5-10 show alternative constructions for the fibers. Referring to FIGS. 5 and 6, those components which are the same as the components of the embodiment of FIGS. 1 and 2 are given the same reference numerals, only with an "a" affixed thereto. The embodiment of FIGS. 5 and 6 feature a fiber 30 comprising core 12a, cladding 14a, jacket 18a and a single cladding insert 32 with rectangular cross section. The cladding insert 32 is similar in composition to cladding insert 16 of the embodiment of FIGS. 1 and 2. The etching process produces a generally U-shaped key 34 as shown in FIG. 6 which can be used for precise alignment.

Referring to FIGS. 7 and 8, those components which are the same as the components of the embodiment of FIGS. 1 and 2 are given the same reference numerals, only with a "b" affixed thereto. The embodiment of FIGS. 7 and 8 show a fiber 40 with a further variation of the cladding inserts and the corresponding fiber alignment features. A cladding insert 42 is generally "D" shaped and is similar in composition to cladding insert 16 of the embodiment of FIGS. 1 and 2. The etching process produces a generally "D" shaped fiber tip with a flat shoulder 44.

Referring to FIGS. 9 and 10, those components which are the same as the components of the embodiment of FIGS. 1 and 2 are given the same reference numerals, only with a "c" affixed thereto. The embodiment of FIGS. 9 and 10 show a fiber 50 with a further variation of the cladding inserts and the corresponding fiber alignment features. In this embodiment, the cladding insert 52 completely surrounds the cladding layer 14c which is generally square shaped. The cladding insert 52 is similar in composition to cladding insert 16 of the embodiment of FIGS. 1 and 2. The etching process leaves a generally square shaped fiber tip with four flat sides 54.

The presence of the alignment features of the embodiments shown greatly simplifies indexing of the fibers within fiber optic connectors, provided they contain respective mating features. Inserts can also be made in other shapes, as to produce different alignment surfaces and keys on the fiber tip. Such inserts can also be made to produce triangular, or multiple grooved fiber tips. In addition, it would be relatively easy to provide a spiral insert as well, which would produce a spiral thread on a fiber surface upon etching.

In view of the above, it can be readily seen that the presence of intrinsic alignment features greatly simplifies the tasks of precise mechanical indexing of optical fibers, along with a capability to precisely control the outer shape of the fiber tip.

I claim:

1. An optical fiber comprising:
    a) a core having a core optical index of refraction;
    b) a cladding layer surrounding said core;
    c) cladding insert means joined to said cladding layer;
    d) said cladding layer and said cladding insert means each having its own optical index of refraction, mechanical properties, and solubility properties;
    e) the optical index of refraction of the cladding layer and said cladding insert means being less than the core optical index;
    f) the mechanical properties of said cladding layer and said cladding insert means being generally similar to each other; and
    g) the solubility of said cladding insert means in an etchant or solvent being greater than the solubility of said cladding layer.

2. An optical fiber of claim 1 wherein said cladding insert means is coextensive with said cladding layer.

3. An optical fiber of claim 1 wherein said cladding insert means is coextensive with said cladding layer and is positioned at spaced intervals along said cladding layer.

4. An optical fiber of claim 1 wherein said cladding insert means surrounds said cladding layer.

5. An optical fiber of claim 1 wherein the interface between said cladding layer and said cladding insert means where said cladding insert means is joined to said cladding layer is at least one generally flat surface.

6. An optical fiber of claim 1 wherein the interface between said cladding layer and said cladding insert means where said cladding insert means is joined to said cladding layer is generally U-shaped with generally flat surfaces.

7. An optical fiber of claim 1 wherein said cladding insert means comprises two cladding inserts on opposite sides of and separated by said cladding layer, the interface between said cladding layer and each said cladding insert where each said cladding insert is joined to said cladding layer is a generally flat surface.

8. A method of shaping the tip of an optical fiber comprising
    (1) providing an optical fiber having:
        a) a core;
        b) a cladding layer surrounding said core;
        c) cladding insert means joined to said cladding layer;

d) said cladding layer and said cladding insert each having its own solubility property;

e) the solubility of said cladding insert in an etchant or solvent being substantially greater than the solubility of said cladding layer; and (2) removing the cladding insert means at the tip of the fiber by dissolving or etching the same to thereby change the shape of the tip of the fiber into the shape of the cladding layer from which the cladding insert was removed.

* * * * *